(12) United States Patent
Zhang et al.

(10) Patent No.: US 12,305,105 B1
(45) Date of Patent: May 20, 2025

(54) SILANE-MODIFIED PENETRATION-RESISTANT ULTRA-HIGH-PERFORMANCE CONCRETE, PREPARATION METHOD, AND APPLICATION THEREOF

(71) Applicant: SHANDONG UNIVERSITY, Jinan (CN)

(72) Inventors: Fengling Zhang, Jinan (CN); Kai Pang, Jinan (CN); Rui Zhong, Jinan (CN); Jinglong Li, Jinan (CN); Jinghang Zhang, Jinan (CN); Xiangyu Meng, Jinan (CN); Yupeng Cui, Jinan (CN); Xiufang Zheng, Jinan (CN); Tongchun Su, Jinan (CN); Chenxu Yan, Jinan (CN); Min Tang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/938,522

(22) Filed: Nov. 6, 2024

(30) Foreign Application Priority Data

Apr. 22, 2024  (CN) .......................... 2024104804354

(51) Int. Cl.
  *C09K 21/14*  (2006.01)
  *C09K 21/02*  (2006.01)
(52) U.S. Cl.
  CPC .............. *C09K 21/14* (2013.01); *C09K 21/02* (2013.01)
(58) Field of Classification Search
  CPC .................................................. C04B 26/30
  See application file for complete search history.

(56) References Cited

U.S. PATENT DOCUMENTS

2020/0102248 A1\* 4/2020 Alkhatib ................ C04B 28/04
2022/0389322 A1  12/2022 Chiu

FOREIGN PATENT DOCUMENTS

CN       107382180 A    11/2017
CN       113121174 A     7/2021
(Continued)

*Primary Examiner* — Peter F Godenschwager
(74) *Attorney, Agent, or Firm* — IPRO, PLLC

(57) ABSTRACT

The present invention discloses a silane-modified penetration-resistant ultra-high-performance concrete (UHPC), preparation method, and application thereof, belonging to the field of novel building materials. The concrete comprises the following components by weight: 1417-1517 parts of cement, 135-165 parts of silica fume, 35-43 parts of copper-coated straight steel fibers, 6-10 parts of silane, 0.2-0.6 parts of a defoaming agent, and 410-510 parts of water. The molecular structure of the silane is

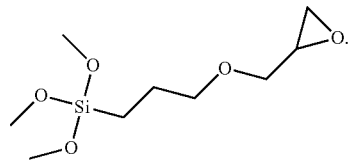

The present invention introduces silane into the UHPC matrix to modify the concrete. After hydration, the silane combines with C-S-H to form silane-C-S-H covalent bonds (with a dissociation energy of 628 kJ/mol), replacing van der Waals forces (with a dissociation energy of 0.4-4 kJ/mol). This effectively enhances the static mechanical properties and high-velocity impact and explosion resistance of traditional UHPC, significantly improving its penetration resistance while maintaining extremely high strength.

8 Claims, 4 Drawing Sheets

(56) References Cited

FOREIGN PATENT DOCUMENTS

| | | | |
|---|---|---|---|
| CN | 117105578 | A | 11/2023 |
| CN | 117756473 | A | 3/2024 |
| KR | 20160011410 | A | 2/2016 |

* cited by examiner

FIG. 1 -PRIOR ART-

SILANE-MODIFIED PENETRATION-RESISTANT ULTRA-HIGH-PERFORMANCE CONCRETE, PREPARATION METHOD, AND APPLICATION THEREOF

CROSS-REFERENCE TO RELATED APPLICATIONS

The present invention claims priority to Chinese Patent Application No. CN202410480435.4, titled "SILANE-MODIFIED PENETRATION-RESISTANT ULTRA-HIGH-PERFORMANCE CONCRETE, PREPARATION METHOD, AND APPLICATION THEREOF," filed on Apr. 22, 2024. The entire content of the aforementioned application is incorporated herein by reference for all purposes.

FIELD OF THE INVENTION

The present invention relates to the field of novel building materials, specifically to a silane-modified penetration-resistant ultra-high-performance concrete, preparation method, and application thereof.

BACKGROUND OF THE INVENTION

The disclosure of the background art section is merely intended to enhance the overall understanding of the present invention and should not necessarily be considered as an acknowledgment or any form of suggestion that the information constitutes prior art that is already known to those skilled in the art.

Ultra-high-performance concrete (UHPC) is a new developed cement composite characterized by ultra-high strength, high toughness and durability. Compared to normal strength concrete, UHPC exhibits superior resistance against high-velocity impact. For instance, for a given penetration condition, the penetration depth and crater damage of UHPC are significantly less than those of normal strength concrete. However, as shown in FIG. 1, it should be highlighted that when the further increase of compressive strength beyond a threshold value does not lead to a further enhancement of penetration resistance, indicating the existence of a plateau effect.

The plateau effect of penetration resistance of UHPC can be attributed to the following factors: on one hand, coarse aggregate is typically eliminated in UHPC in order to improve the underlying material homogeneity. However, coarse aggregates are beneficial for enhancing the penetration resistance of concrete materials. On the other hand, the primary hydration product of the UHPC matrix is calcium silicate hydrate (C-S-H), approximately one-third of which is bonded through weak van der Waals forces. Van der Waals forces are a form of weak intermolecular interaction that arise from electrostatic interactions between molecules, and they can be easily disrupted with minimal energy, limiting the penetration resistance of the UHPC matrix. In recent years, high-strength and hard coarse aggregates (such as calcined bauxite coarse aggregates) have been successfully introduced into UHPC to improve its penetration resistance, especially in terms of reducing penetration depth. However, due to the limitation of van der Waals forces, the penetration resistance of the UHPC matrix remains difficult to effectively enhance, thereby restricting the application and promotion of UHPC in protective engineering.

SUMMARY OF THE INVENTION

To address the shortcomings of the prior art, the objective of the present invention is to provide a silane-modified penetration-resistant ultra-high-performance concrete (UHPC), along with its preparation method and application. The present invention utilizes silane to modify the UHPC matrix, thereby enhancing its penetration resistance under the impact of high-velocity projectiles.

To achieve the above objective, the technical solutions of the present invention are as follows:

In a first aspect, the present invention provides a silane-modified penetration-resistant UHPC, which comprises the following components in parts by weight:

cement: 1417-1517 parts, silica fume: 135-165 parts, copper-coated straight steel fibers: 35-43 parts, silane: 6-10 parts, defoaming agent: 0.2-0.6 parts, and water: 410-510 parts.

The molecular structure of the silane is:

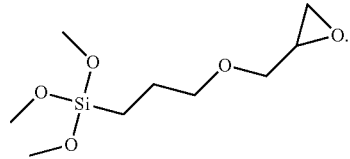

The present invention utilizes silane to modify UHPC. After incorporating silane, it reacts with the primary hydration product of the UHPC matrix, calcium silicate hydrate (C-S-H), forming covalent bonds that replace the previously weak van der Waals forces, thereby enhancing the penetration resistance of the UHPC under the impact of high-velocity projectiles.

In a second aspect, the present invention provides a method for preparing the silane-modified penetration-resistant UHPC described above, which includes the following steps:

step 1: mixing silane with 65%-75% of the total water to obtain a silane aqueous solution;

step 2: mixing cement and silica fume to obtain a first mixture;

step 3: combining the first mixture, the silane aqueous solution, and a defoaming agent, then adding the remaining water to obtain a second mixture;

step 4: mixing the second mixture with copper-coated straight steel fibers, thereby obtaining the silane-modified penetration-resistant UHPC.

In a third aspect, the present invention provides an application of the silane-modified penetration-resistant UHPC in protective engineering.

Advantages of the Present Invention

1. The present invention improves the mechanical properties and penetration resistance of concrete by blending multiple materials, providing a silane-modified penetration-resistant UHPC. Specifically, the inventors drew inspiration from the organic-inorganic hybrid structure of natural nacre, known for its high strength and toughness, to develop the silane-modified penetration-resistant UHPC utilizing a silane-modified UHPC matrix. During the preparation of the silane-modified penetration-resistant UHPC, methoxy groups (—$OCH_3$) in the silane undergo hydrolysis and are replaced by hydroxyl groups, forming T-silane. T-silane can integrate into the silicate chains of the C-S-H gel, forming silane-C-S-H covalent bonds through organic-inorganic hybridization, replacing the previously weak van der Waals forces. This significantly enhances the penetration resistance of the UHPC matrix. Additionally, the incorporation of silane also promotes cement hydration. The silane derivatives produced after hydrolysis react with calcium hydroxide formed during hydration, generating more C-S-H gel that fills the micro-cracks in the matrix, thereby improving the mechanical properties of the UHPC matrix, such as compressive strength and toughness.

2. Through the test, compared with the control group without silane, the compressive strength and elastic modulus of UHPC with silane increased by 26% and 12% respectively, and the flexural strength increased by 8%. The penetration depth of the silane-modified UHPC under a ~600 m/s projectile impact was 54.9 mm, and the crater diameter was 88.4 mm. Compared to the control group without silane, the penetration depth was reduced by 30%. The excellent high-velocity impact and explosion resistance greatly expand the application range of UHPC in protective engineering.

3. The present invention also leverages the bridging effect of steel fibers to suppress the formation, propagation, and spalling of cracks under high-velocity impact during penetration. At the same time, it transforms the failure mode of concrete under high-velocity impact from pulverization to a more cohesive damage pattern. This is due to the bonding, frictional, and interlocking effects between the steel fibers and the matrix, which require substantial energy to pull out the steel fibers from the concrete matrix, thereby effectively reducing damage under high-velocity impact. When the steel fibers are pulled out of the concrete matrix, they leave voids that provide space for thermal expansion under high-velocity penetration, thereby preventing more extensive damage caused by internal compression of the concrete.

BRIEF DESCRIPTION OF DRAWINGS

The accompanying drawings to the specification, which form part of the the present invention, are used to provide a further understanding of the present invention, and the illustrative examples of the present invention and the description thereof are used to explain the present invention and are not unduly limiting the present invention.

DETAILED DESCRIPTION OF THE INVENTION

Figure 1:
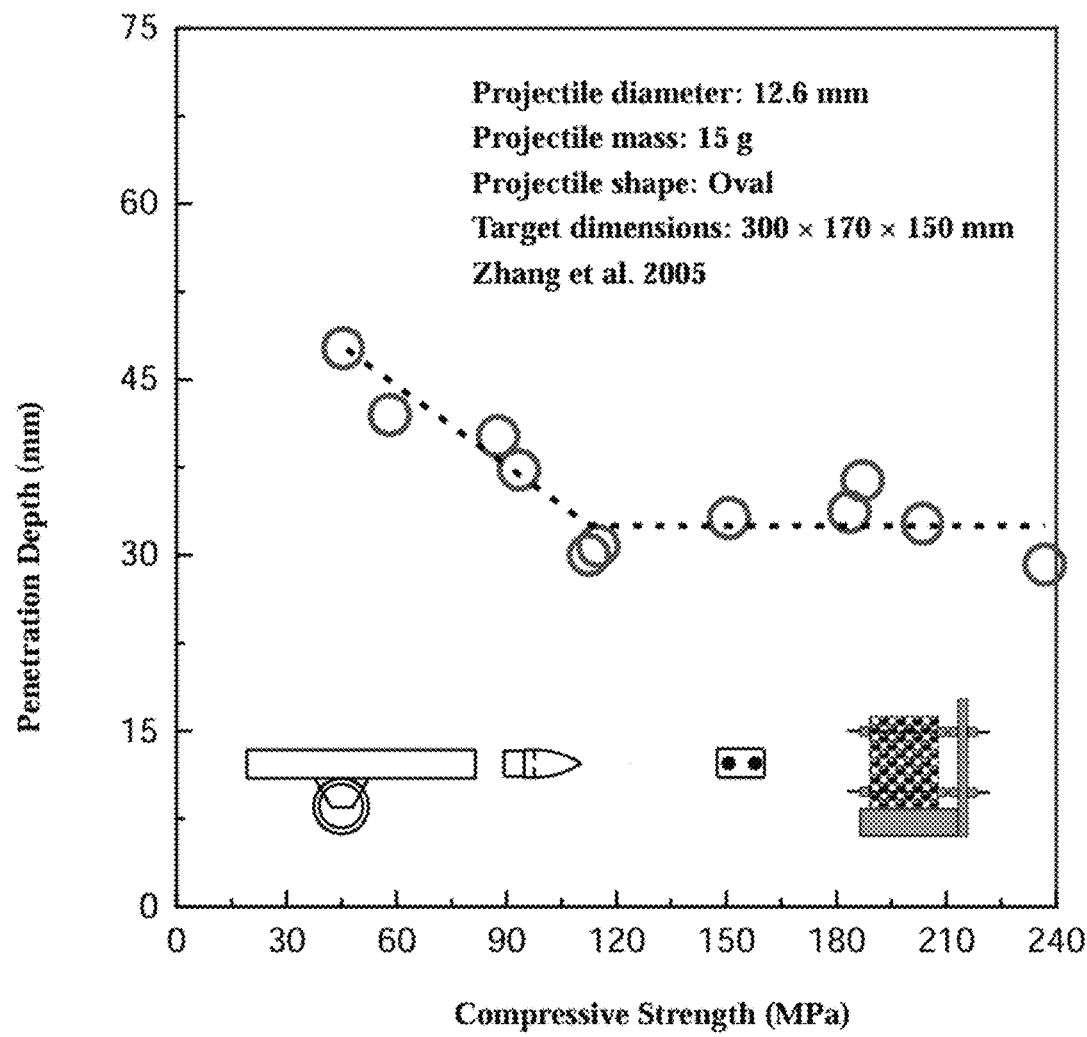
FIG. 1 is a schematic diagram illustrating the plateau effect of penetration resistance of UHPC.
Figure 2:
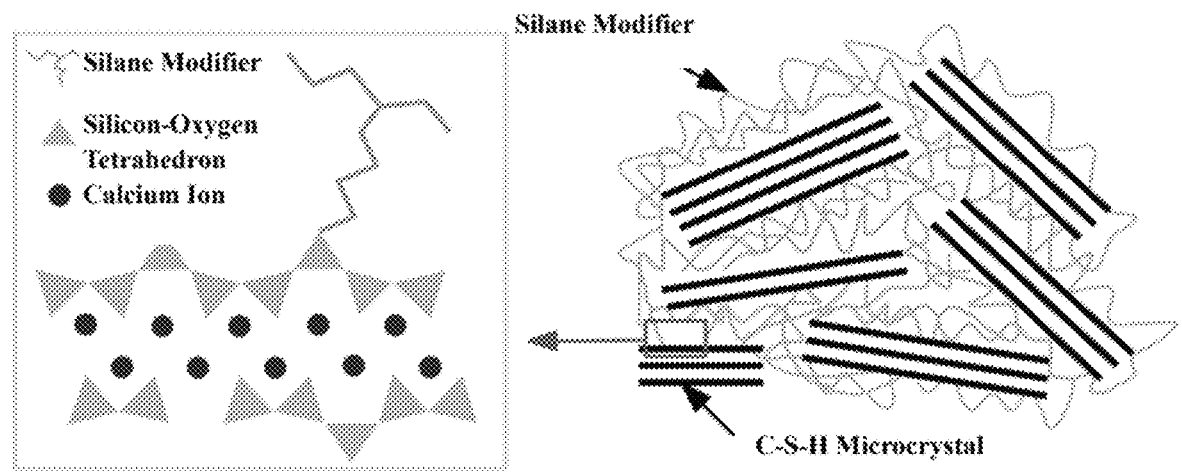
FIG. 2 is a schematic diagram illustrating the silane modification mechanism in the silane-modified penetration-resistant UHPC according to the present invention.

Given that approximately one-third of the calcium silicate hydrate (C-S-H) gel in the UHPC matrix is bonded through weak van der Waals forces, which are weak intermolecular forces arising from electrostatic interactions and can be disrupted with minimal energy, thus limiting the penetration resistance of the UHPC matrix, the present invention proposes a silane-modified penetration-resistant UHPC, along with its preparation method and application.

A typical embodiment of the present invention provides a silane-modified penetration-resistant UHPC, which comprises the following components in parts by weight:
cement: 1417-1517 parts, silica fume: 135-165 parts, copper-coated straight steel fibers: 35-43 parts, silane: 6-10 parts, defoaming agent: 0.2-0.6 parts, and water: 410-510 parts.

The molecular structure of the silane is:

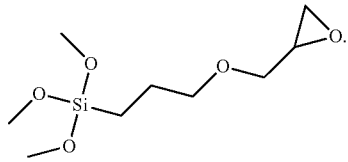

The inventors drew inspiration from the organic-inorganic hybrid structure of natural nacre, known for its high strength and toughness, utilizing a silane-modified UHPC matrix, thereby providing a silane-modified penetration-resistant UHPC. During the preparation of the silane-modified penetration-resistant UHPC, methoxy groups ($-OCH_3$) in the silane undergo hydrolysis and are replaced by hydroxyl groups, forming T-silane. T-silane can integrate into the silicate chains of the C-S-H gel, forming silane-C-S-H covalent bonds through organic-inorganic hybridization, replacing the previously weak van der Waals forces. This significantly enhances the penetration resistance of the UHPC matrix. Additionally, the incorporation of silane also promotes cement hydration. The silane derivatives produced after hydrolysis react with calcium hydroxide formed during hydration, generating more C-S-H gel that fills the micro-cracks in the matrix, thereby improving the mechanical properties of the UHPC matrix, such as compressive strength and toughness.

In some examples of the present embodiment, the silane is prepared by heating epoxysilane, however, it is understood that the silane used in the present invention can also be obtained through other methods.

In some examples of the present embodiment, the silane-modified penetration-resistant UHPC comprises the following components in parts by weight:
cement: 1468 parts, silica fume: 147 parts, copper-coated straight steel fibers: 39 parts, silane: 8 parts, defoaming agent: 0.4 parts, and water: 452 parts. Experimental verification has shown that the silane-modified penetration-resistant UHPC obtained with this composition exhibits optimal performance, with the best penetration resistance.

In some examples of the present embodiment, the cement is 52.5-grade or 52.5R-grade Portland cement or ordinary Portland cement.

In some examples of the present embodiment, the silica fume contains more than 95 wt % amorphous silicon dioxide, with a specific surface area greater than 21.0 m²/g and a bulk density greater than 2.2. The silica fume used in the present invention is ultra-fine dry powder that has not been fully densified.

In some examples of the present embodiment, the copper-coated straight steel fibers have an average length of 13 mm, an average diameter of 0.16 mm, a tensile strength greater than 2500 MPa, an elastic modulus of 200 GPa, and a density of 7800 kg/m³.

In some examples of present embodiment, the defoaming agent includes tri-butyl phosphate (TBP).

Another typical embodiment of the present invention provides a method for preparing the above-mentioned silane-modified penetration-resistant UHPC, which includes the following steps:
- step 1: mixing silane with 65%-75% of the total water to obtain a silane aqueous solution;
- step 2: mixing cement and silica fume to obtain a first mixture;
- step 3: combining the first mixture, the silane aqueous solution, and a defoaming agent, then adding the remaining water to obtain a second mixture;
- step 4: mixing the second mixture with copper-coated straight steel fibers, thereby obtaining the silane-modified penetration-resistant UHPC.

In some examples of the present embodiments, in step 1, the mixing is performed by stirring, and the stirring is performed using magnetic stirring for 20-40 minutes.

In some examples of the present embodiments, in step 2, the mixing is also performed by stirring; a speed of the stirring is 75-85 rpm (low-speed stirring), and the time for the stirring is 2-3 minutes. Low-speed stirring can prevent powder from splashing.

In some examples of the present embodiment, in step 3, when mixing the first mixture, the silane aqueous solution, and the defoaming agent, stirring is employed at a speed of 75-85 rpm (i.e., low-speed stirring). After adding the remaining water, the stirring speed remains unchanged, and stirring continues for another 3-5 minutes to obtain the second mixture.

In some examples of the present embodiment, in step 4, once the fresh concrete (i.e., the second mixture) achieves good flowability, copper-coated straight steel fibers are slowly added through a square-hole sieve.

Specifically, "good flowability" means that the cementitious material is well-mixed without bleeding (i.e. any material floating to the surface of the fresh concrete).

In some examples of the present embodiments, in step 4, the mixing is performed by stirring; the stirring speed is 155-165 rpm (medium-speed stirring) for 3-5 minutes. After the second mixture is thoroughly mixed with the copper-coated straight steel fibers, the mixture is subjected to high-speed stirring (355-365 rpm) for 1-2 minutes, followed by pouring and molding, and then curing until the specified age. Wherein the curing is conducted under standard curing conditions (temperature: 20±2° C., relative humidity: >95% RH). High-speed stirring ensures a quicker and more uniform mixture.

In some examples of the present embodiment, during the pouring and molding process, a vibrating table may be used for light vibration for 1-2 minutes to help release air bubbles and improve the density.

After pouring, the concrete is covered with plastic film to prevent surface moisture loss, and the concrete specimen is demolded after 24 hours.

In some examples of the present embodiment, the silane is prepared by the following method:
heating epoxy silane at 110-130° C. for 3-5 hours.

A third typical embodiment of the present invention provides an application of the above-mentioned silane-modified penetration-resistant UHPC in protective engineering.

To enable those skilled in the art to understand the technical solutions of the present invention more clearly, the following specific examples are described in detail.

In the following examples, the cement used is 52.5-grade or 52.5R-grade Portland cement or ordinary Portland cement. The copper-coated straight steel fibers used have an average length of 13 mm, an average diameter of 0.16 mm, a tensile strength greater than 2500 MPa, an elastic modulus of 200 GPa, and a density of 7800 kg/m$^3$. The silica fume used contains more than 95 wt % amorphous silicon dioxide, with a specific surface area greater than 21.0 m$^2$/g and a bulk density greater than 2.2, and is an ultra-fine dry powder that has not been fully densified. The defoaming agent used is Tri-Butyl Phosphate (TBP). The molecular structure of the silane used is

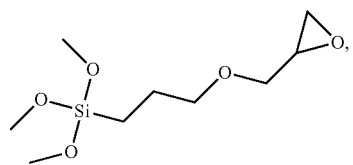

which can be purchased or prepared by heating epoxy silane.

The raw materials used in the following examples are all conventional products that can be purchased, unless otherwise specified.

Example 1

A silane-modified penetration-resistant UHPC was prepared, comprising the following components by weight:
1467 parts of 52.5-grade or 52.5R-grade ordinary Portland cement, 147 parts of non-fully densified silica fume, 8 parts of silane, 0.4 parts of TBP, 39 parts of copper-coated straight steel fibers, and 452 parts of tap water.

Figure 3:
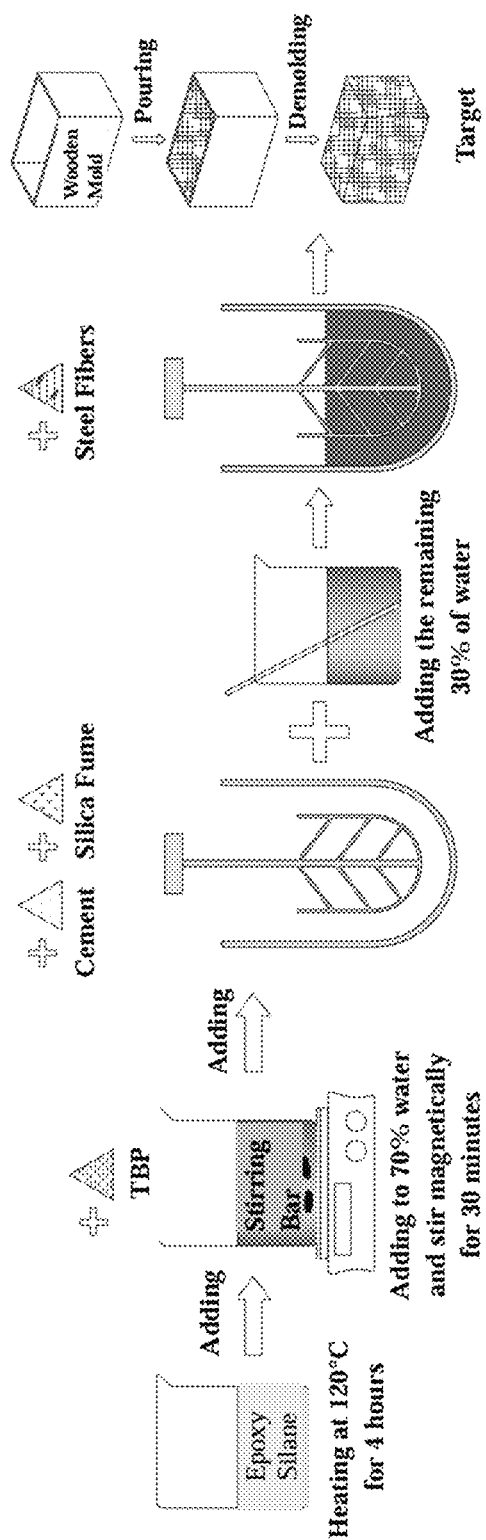
FIG. 3 is a flowchart of the preparation process for the silane-modified penetration-resistant UHPC according to example 1 of the present invention.

A preparation method is shown in FIG. 3 and specifically included the following steps:
first, the silane was prepared by heating epoxy silane at 120° C. for 4 hours.
- Step 1: the prepared silane was added to 316.4 kg/m$^3$ of water, stirred using magnetic stirring for 30 minutes, and then set aside at ambient temperature (20±2° C.) and relative humidity (>95% RH).
- Step 2: the measured 1467 kg/m$^3$ of cement, 147 kg/m$^3$ of silica fume were added to the mixer at once, and low-speed stirring was conducted for 2-3 minutes until evenly mixed (wherein 1467 kg/m$^3$ of cement indicates that each cubic meter of the penetration-resistant UHPC contained 1467 kg of cement).
- Step 3: the prepared silane solution and TBP were added to the mixer, stirred until evenly mixed, and then the remaining 135.6 kg/m$^3$ of water was added, continuing low-speed stirring until uniform.
- Step 4: the 39 parts of copper-coated straight steel fibers were uniformly added to the mixer, and medium-speed stirring was conducted until evenly mixed.
- Step 5: after high-speed stirring, the mixture was poured and molded, and then cured under standard conditions (temperature: 20±2° C., relative humidity: >95% RH) until the specified age.

Example 2

A silane-modified penetration-resistant UHPC, compared to Example 1, differs in that it comprises the following components by weight:

1417 parts of 52.5-grade or 52.5R-grade ordinary Portland cement, 135 parts of non-fully densified silica fume, 6 parts of silane, 0.2 parts of TBP, 35 parts of copper-coated straight steel fibers, and 410 parts of tap water.

Example 3

A silane-modified penetration-resistant UHPC, compared to Example 1, differs in that it comprises the following components by weight:
1517 parts of 52.5-grade or 52.5R-grade ordinary Portland cement, 165 parts of non-fully densified silica fume, 10 parts of silane, 0.6 parts of TBP, 43 parts of copper-coated straight steel fibers, and 510 parts of tap water.

Comparative Example 1

Comparative Example 1 is an UHPC without silane, comprising the following components by weight:
1479 parts of 52.5-grade or 52.5R-grade ordinary Portland cement, 148 parts of non-fully densified silica fume, 39 parts of copper-coated straight steel fibers, 452 parts of tap water, and 4 parts of polycarboxylate superplasticizer.

Comparative Example 2

Comparative Example 2 is an UHPC without silane, comprising the following components by weight:
1467 parts of 52.5-grade or 52.5R-grade ordinary Portland cement, 147 parts of non-fully densified silica fume, 0.4 parts of TBP, 39 parts of copper-coated straight steel fibers, and 452 parts of tap water.

The UHPC from the above examples and comparative examples was subjected to conventional mechanical testing and high-velocity projectile penetration resistance testing, with the results shown in Table 1. The high-velocity projectile penetration resistance testing process was the same as that described in Chinese patent application No. 2023117815297 titled "A Penetration-Resistant Ultra-High-Performance Concrete and Preparation Method and Application Thereof," except that the impact velocity was increased from 400 m/s to 650 m/s.

example 1. These improvements in mechanical properties are attributed to the adjustment of the bonds and bonding methods between the hydration products in the ultra-high-performance concrete matrix. The primary hydration product of ordinary Portland cement is calcium silicate hydrate (C-S-H), which is the main source of cohesion and mechanical properties in cementitious composites. However, most C-S-H is bonded by weak van der Waals forces, with dissociation energies ranging from only 0.4 to 4.0 kJ/mol. The methoxy groups in the silane modifier are easily hydrolyzed in water and replaced by hydroxyl groups, forming covalent bonds with the carboxyl groups on the surface of C-S-H, creating an organic polymer-inorganic C-S-H hybrid (silane-C-S-H covalent bond). The strength of the silicon-oxygen covalent bond is 628 kJ/mol, which is significantly higher than the strength of van der Waals bonds. This substantial increase in bond strength at the molecular level greatly enhances the strength of the matrix, requiring the absorption of more energy when the material fails, thereby providing UHPC with superior mechanical properties.

Due to the high degree of hydration of the silane modifier, various silane derivatives with a high number of silane units are produced during hydration. These derivatives, similar to silica, can react with calcium hydroxide formed during hydration to generate more C-S-H gel. This gel can fill the voids between the matrix, reducing its porosity. As a result, the generation and propagation of cracks are reduced under external loads, improving the compressive strength, flexural strength, and penetration resistance of UHPC.

As shown in Table 1, compared to the target in comparative example 1, the target in example 1 exhibited superior mechanical properties and penetration resistance, particularly in penetration depth. The penetration depth of the UHPC in example 1 under an 8 mm diameter projectile at an impact velocity of 650 m/s was 54.9 mm. Compared to the UHPC in comparative example 1, which did not contain a silane modifier and had a penetration depth of 79.5 mm, the penetration depth in example 1 was reduced by 30%. Additionally, when comparing example 1 to comparative example 1, the projectile head in example 1 exhibited more significant wear. This demonstrates that after the silane modifier reacts with C-S-H during hydration, the compressive strength of the concrete was significantly enhanced, requiring more energy to break the covalent bonds, thereby

TABLE 1

|  | Compressive Strength (MPa) | Elastic Modulus (GPa) | Flexural Strength (MPa) | Penetration Depth (mm) | Crater Diameter (mm) | Projectile Mass Loss (%) |
| --- | --- | --- | --- | --- | --- | --- |
| Example 1 | 118.8 | 24.9 | 12.6 | 54.9 | 88.4 | 0.4 |
| Comparative Example 1 | 93.8 | 22.2 | 11.6 | 79.5 | 89.3 | 0.3 |
| Comparative Example 2 | 95.5 | 23.4 | 12.1 | 65.4 | 89.1 | 0.32 |

Note: Penetration depth refers to the distance from the impact surface of the target to the deepest point of the crater.

Crater diameter refers to the diameter of an equivalent circle with the same area as the crater on the target.

Crater volume refers to the volume of the crater on the target.

Figure 4:
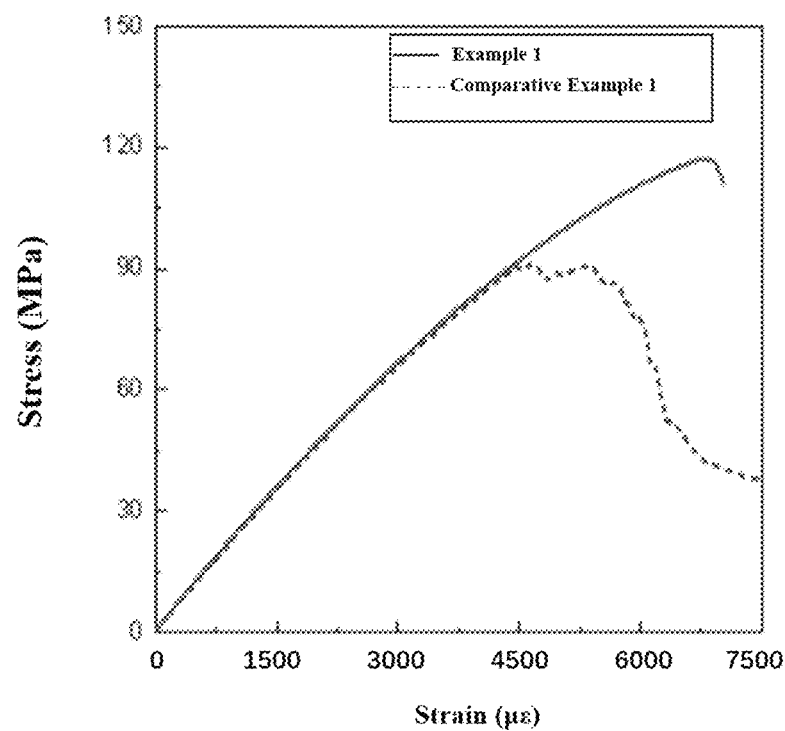
FIG. 4 is a stress-strain curve of the concrete materials prepared according to example 1 of the present invention and comparative example 1.
Figure 5:
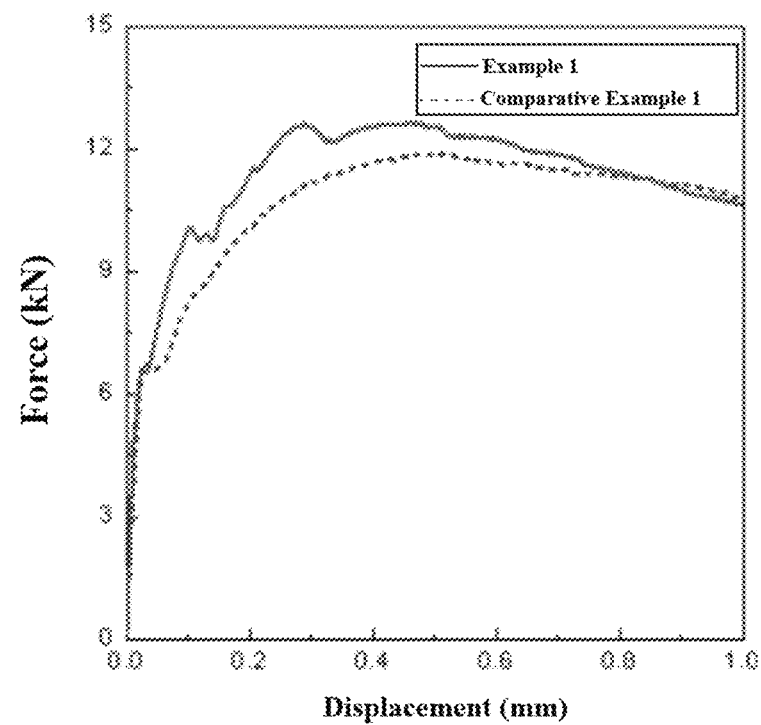
FIG. 5 is a force-displacement curve of the concrete materials prepared according to example 1 of the present invention and comparative example 1 under a four-point bending test.

By comparing Table 1 with FIGS. 4 and 5, it can be observed that example 1 shows a 26% increase in compressive strength, a 12% increase in elastic modulus, and an 8% increase in flexural strength compared to comparative significantly reducing the penetration depth. However, adding the silane modifier to UHPC did not have a significant impact on the crater diameter caused by high-velocity projectiles.

The defoaming agent effectively disrupts the surface tension of bubbles, causing them to dissipate quickly, which reduces the air content in the concrete, minimizes the formation of voids, and enhances the density and strength of the concrete. In the UHPC matrix without TBP, bubbles were present, leading to poor homogeneity in the concrete.

As shown in Table 1, the mechanical properties of the UHPC without TBP were inferior to those with TBP. Similarly, under conditions where silane was added, the further addition of TBP, combined with stirring, significantly improved the homogeneity of the concrete, thereby further enhancing the modification effect of silane on the UHPC matrix.

Therefore, the UHPC provided by the present invention exhibits excellent high-velocity projectile penetration resistance and mechanical properties, with penetration resistance significantly higher than that of the UHPC in comparative example 1, which did not contain a silane modifier. The addition of the silane modifier, which forms an organic polymer-inorganic C-S-H hybrid, enhances the penetration resistance of UHPC. On one hand, the silane modifier provides high bond energy covalent bonds, improving the mechanical properties of the material. On the other hand, it generates additional C-S-H gel during hydration, which fills the voids and delays the generation and propagation of cracks under external forces. The optimization of penetration resistance and mechanical properties by the silane modifier makes UHPC a suitable material for use as a modern protective material.

The above descriptions are merely preferred embodiments of the present invention and are not intended to limit the present invention. For those skilled in the art, various changes and modifications can be made to the present invention. Any modification, equivalent replacement, or improvement made within the spirit and principles of the present invention should be included within the scope of the present invention's protection.

The invention claimed is:

1. A silane-modified penetration-resistant ultra-high-performance concrete, comprising the following components in parts by weight:
   cement: 1417-1517 parts, silica fume: 135-165 parts, copper-coated straight steel fibers: 35-43 parts, silane: 6-10 parts, defoaming agent: 0.2-0.6 parts, and water: 410-510 parts;
   the molecular structure of the silane is:

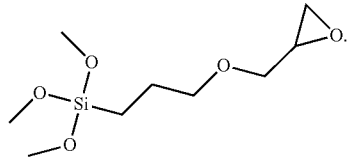

2. The silane-modified penetration-resistant ultra-high-performance concrete according to claim 1, wherein, comprising the following components in parts by weight:
   cement: 1468 parts, silica fume: 147 parts, copper-coated straight steel fibers: 39 parts, silane: 8 parts, defoaming agent: 0.4 parts, and water: 452 parts.

3. The silane-modified penetration-resistant ultra-high-performance concrete according to claim 1, wherein the cement is 52.5-grade or 52.5R-grade Portland cement.

4. The silane-modified penetration-resistant ultra-high-performance concrete according to claim 1, wherein the silica fume contains more than 95 wt % amorphous silicon dioxide, has a specific surface area greater than 21.0 $m^2/g$, and a bulk density greater than 2.2 $g/cm^3$.

5. The silane-modified penetration-resistant ultra-high-performance concrete according to claim 1, wherein the copper-coated straight steel fibers have an average length of 13 mm, an average diameter of 0.16 mm, a tensile strength greater than 2500 MPa, an elastic modulus of 200 GPa, and a density of 7800 $kg/m^3$.

6. The silane-modified penetration-resistant ultra-high-performance concrete according to claim 1, wherein the defoaming agent comprises Tri-Butyl Phosphate.

7. A method for preparing a silane-modified penetration-resistant ultra-high-performance concrete according to claim 1, comprising the following steps:
   step 1: mixing silane with 65%-75% of the total water to obtain a silane aqueous solution;
   step 2: mixing cement and silica fume to obtain a first mixture;
   step 3: combining the first mixture, the silane aqueous solution, and a defoaming agent, then adding the remaining water to obtain a second mixture;
   step 4: mixing the second mixture with copper-coated straight steel fibers, thereby obtaining the silane-modified penetration-resistant ultra-high-performance concrete.

8. The method according to claim 7, wherein: in step 1, the mixing is performed by stirring, and the stirring is performed using magnetic stirring for 20-40 minutes;
   or, in step 2, the mixing is performed by stirring at 75-85 rpm for 2-3 minutes;
   or, in step 3, after adding the remaining water, stirring is continued for 3-5 minutes to obtain the second mixture;
   or, in step 4, the mixing is performed by stirring at 155-165 rpm for 3-5 minutes; after the second mixture is thoroughly mixed with the copper-coated straight steel fibers, a high-speed stirring with a speed of 355-365 rpm is performed for 1-2 minutes, followed by pouring and curing until a specified age.

* * * * *